United States Patent [19]

Oyama et al.

[11] Patent Number: 5,324,599
[45] Date of Patent: Jun. 28, 1994

[54] REVERSIBLE ELECTRODE MATERIAL

[75] Inventors: Noboru Oyama, Fuchu; Katsuhiko Naoi, Mitaka; Tadashi Sotomura, Kashiwara; Hiroshi Uemachi, Osaka; Yoshiko Sato, Neyagawa; Teruhisa Kanbara, Ikeda; Kenichi Takeyama, Osaka, all of Japan

[73] Assignee: Matsushita Electric Industrial Co., Ltd., Osaka, Japan

[21] Appl. No.: 826,000

[22] Filed: Jan. 27, 1992

[30] Foreign Application Priority Data

| Jan. 29, 1991 | [JP] | Japan | 3-008927 |
| Feb. 22, 1991 | [JP] | Japan | 3-028405 |
| Feb. 28, 1991 | [JP] | Japan | 3-033976 |
| Mar. 1, 1991 | [JP] | Japan | 3-035865 |
| Mar. 11, 1991 | [JP] | Japan | 3-044734 |
| Jun. 10, 1991 | [JP] | Japan | 3-137415 |
| Jun. 18, 1991 | [JP] | Japan | 3-145856 |

[51] Int. Cl.$^5$ ......................... H01M 4/60; H01M 6/18
[52] U.S. Cl. .................................. 429/192; 429/213; 252/182.1; 525/417; 525/540
[58] Field of Search ..................... 429/213, 191, 192; 252/182.1; 525/417, 540

[56] References Cited

U.S. PATENT DOCUMENTS 4,833,048  5/1989  Dejorghe et al.
5,158,578  10/1992 Yoshimoto et al. ............ 429/218 X

FOREIGN PATENT DOCUMENTS 318430  5/1989  European Pat. Off.
4155766  5/1992  Japan.

OTHER PUBLICATIONS

Meilin Liu et al, "Electrochemical Investigations of Novel Solid Redox Polymerization Electrodes", *Proceedings of the Symposium on Rechargeable Lithium Batteries*, (no date) The Electrochemical Society, Inc., Pennington, New Jersey, Proceedings vol. 90-5, pp. 233-243 (date unknown).

European search report for corresponding application 92101458.5, dated Dec. 4, 1992.
"New Organodisulfide-Polyaniline Composite Cathode for Secondary Lithium Battery", by T. Sotomura (no date).
"An Enhanced Redox Process of Disulfide Compounds @ Polyaniline Film Electrode" by K. Naoi—Manuscript Sub. to J. Elect. Composite (no date).
"Novel Solid Redox Polymerization Electrodes" by M. Liu et al. J. Electrochem. Soc. vol. 138, No. 7, Jul. 1991, pp. 1896–1901.
"Electrochemical Prop. of Organic Disulfide/Thiolate Redox Couples" J. of Elect. Soc. vol. 136, No. 9, Sep. 1989, pp. 2570–2575 (w/cited in the Engl. Text).

*Primary Examiner*—John S. Maples
*Attorney, Agent, or Firm*—Ratner & Prestia

[57] ABSTRACT

The present invention provides an electrode material comprising a combination of a compound having a disulfide group and a conductive polymer, or a conductive polymer having a disulfide group, wherein an S-S bond of the disulfide group is cleaved by the electrolytic reduction to form a sulfur-metal ion bond or a sulfur-proton bond, and the sulfur-metal ion bond or the sulfur-proton bond re-forms an S-S bond by the electrolytic oxidation. The present invention also provides a lithium rechargeable battery comprising a cathode, a solid electrolyte, and an anode, wherein the cathode is made of a composition containing as its main components lithium thiolate having a sulfur-lithium ion bond capable of forming a disulfide bond by the electrolytic oxidation and a $\pi$ electron conjugated conductive polymer; or a composition containing as its main component a $\pi$ electron conjugated conductive polymer having a sulfur-lithium ion bond capable of forming a disulfide bond by electrolytic oxidation; the solid electrolyte is a composition containing a salt containing lithium, or a polymer containing the salt; and the anode is made of a composition containing as its main components aluminium or an alloy containing aluminium, and carbon.

7 Claims, 4 Drawing Sheets

REVERSIBLE ELECTRODE MATERIAL

BACKGROUND OF THE INVENTION

1. Field of the Invention

The present invention relates to a reversible electrode material, a method for producing a reversible electrode using the electrode material, and a lithium battery using the reversible electrode.

2. Description of the Prior Art

Since conductive polyacetylene was discovered by Shirakawa et al. in 1971, the use of this conductive polymer as an electrode material has been extensively studied. This is because electrochemical devices such as lightweight batteries with a high energy, electrochromic elements having a large area, and biochemical sensors using minute electrodes can be expected by using the conductive polymer as the electrode material. However, since polyacetylene has some disadvantages for practical use because of its chemical instability, other $\pi$ electron conjugated conductive polymers, which are relatively stable, such as polyaniline, polypyrrole, polyacene, and polythiophene have been studied. Lithium secondary batteries using these polymers for their cathodes have been developed. Since these polymer electrodes take in anions existing in the electrolyte as well as cations while they are charged or discharged, the electrolyte in the battery not only functions as a medium for ion conduction but also participates in the battery reaction. Therefore, it is required that the electrolyte is supplied to the battery in an amount corresponding to the battery capacity. The energy density of the battery is limited in the range of about 20 to 50 Wh/kg, which is nearly equal to or lower than that of conventional secondary batteries such as nickel-cadmium or lead-acid batteries.

As an electrode material which can provide a higher energy density, a disulfide compound has been disclosed in the U.S. Pat. No. 4,833,048. This compound is most simply represented by R-S-S-R (where R is an aliphatic or an aromatic organic group and S is a sulfur atom). An S-S bond is cleaved by the electrolytic reduction in an electrolytic cell containing cation of $M^+$ to form a salt represented by $R-S^-.M^+$. This salt returns to the R-S-S-R by the electrolytic oxidation. In the U.S. Pat. No. 4,833,048, a metal-sulfur type rechargeable battery obtained by combining a disulfide compound with metal M which supplies and captures the cations $(M^+)$ has been proposed. According to this rechargeable battery, an energy density of 150 Wh/kg or more, which is much more than that of conventional secondary batteries, can be expected.

As described above, the disulfide compound is proposed as an electrode material which can provide a higher energy density. However, as the inventors of U.S. Pat. No. 4,833,048 reported in J. Electrochem. Soc, Vol. 136, No. 9, pp. 2570 to 2575 (1989), the difference between the oxidation potential and the reduction potential is very large. For example, when $[(C_2H_5)_2NCSS-]_2$ is electrolyzed, the oxidation potential differs from the reduction potential by 1 V or more. According to the electrode reaction theory, the electron transfer of the disulfide compound proceeds extremely slowly. Because of this, it is rather difficult to obtain a rechargeable battery providing a higher current output of 1 mA/cm$^2$ or more at room temperature. The operation of a battery comprising an electrode of disulfide compound is limited to a high temperature in the range of 100° to 200° C., where the electron transfer can proceed faster.

SUMMARY OF THE INVENTION

The reversible electrode material of this invention, which overcomes the above-discussed and numerous other disadvantages and deficiencies of the prior art, comprises a combination of a compound having a disulfide group and a conductive polymer or a conductive polymer having a disulfide group, wherein an S-S bond of the disulfide group is cleaved by the electrolytic reduction to form a sulfur-metal ion bond or a sulfur-proton bond, and the sulfur-metal ion bond or the sulfur-proton bond re-forms the S-S bond by electrolytic oxidation.

In a preferred embodiment, the electrode material comprises a combination of a compound having a disulfide group and a conductive polymer, wherein the compound having a disulfide group has a cleavable disulfide group in its molecule.

In a preferred embodiment, the conductive polymer having a disulfide group is obtained by introducing a disulfide group into a $\pi$ electron conjugated conductive polymer.

In a preferred embodiment, the conductive polymer having a disulfide group is obtained by the electrolytic polymerization of a monomer which has a disulfide group and is capable of forming a $\pi$ electron conjugated conductive polymer.

A method for producing a reversible electrode of this invention comprises the steps of:

dimerizing a compound having a thiol group to obtain a dimer having a disulfide group; and conducting the electrolytic polymerization of a monomer capable of forming a $\pi$ electron conjugated conductive polymer in the presence of the dimer.

A lithium secondary battery of this invention comprises a cathode, a solid electrolyte, and an anode, wherein the cathode is made of a composition containing as its main components lithium thiolate having a sulfur-lithium ion bond capable of forming a disulfide bond by the electrolytic oxidation and a $\pi$ electron conjugated conductive polymer; or a composition containing as its main component a $\pi$ electron conjugated conductive polymer having a sulfur-lithium ion bond capable of forming a disulfide bond by the electrolytic oxidation; the solid electrolyte is formed from a composition containing as its main component a salt containing lithium, or a polymer containing the salt; and the anode is made of a composition containing as its main components aluminium or an alloy containing aluminum, and carbon.

In a preferred embodiment, the solid electrolyte is mixed with a composition forming the cathode or a composition forming the anode.

In a preferred embodiment, the solid electrolyte comprises a polyether obtained by adding at least one selected from the group consisting of ethylene oxide and propylene oxide to a polyamine; an ion-exchangeable compound having a layered crystal structure; and a lithium salt represented by LiX (wherein X is a strong acid anion).

Thus, the invention described herein makes possible the objectives of (1) providing a reversible electrode material which can be used for producing a rechargeable battery with a higher energy and a higher current at room temperature; (2) providing a method for effectively producing an electrode using the electrode material; and (3) providing a lithium battery with high safety using the electrode material.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
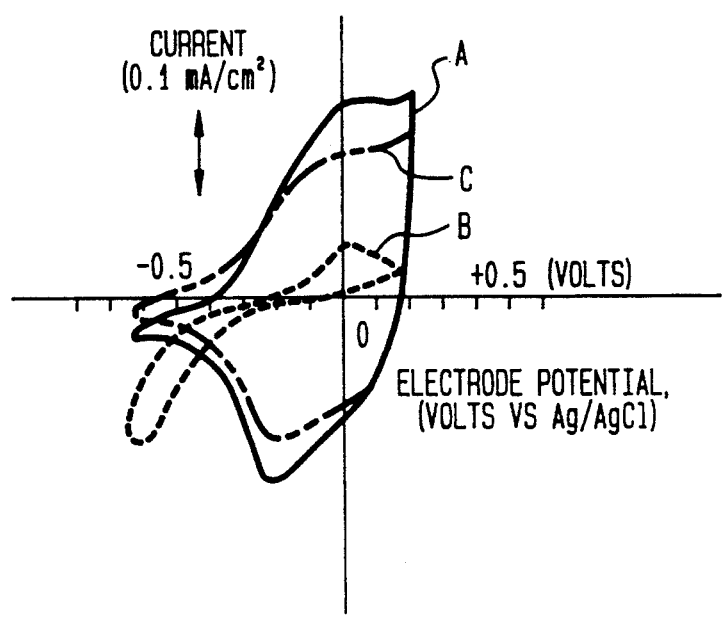
FIG. 1 is a graph showing current-voltage characteristics of a reversible electrode using an electrode material in Example 1 of the present invention and conventional electrodes.

An electrode material of the present invention comprises (1) a combination of a compound having a disulfide group and a conductive polymer; or (2) a conductive polymer having a disulfide group.

In the first electrode material of the present invention, as the compound having a disulfide group, there is a compound represented by the general formula $(R(S)_y)_n$ which is disclosed in U.S. Pat. No. 4,833,048. This compound can be represented by $R(SH)_y$ or $R(SM)_y$ when reduced. Here, R is an aliphatic group or an aromatic group, S is sulfur, H is a proton, M is a metal atom, y is an integer of 1 or more, and n is an integer of 2 or more, Examples of this reduced form of disulfide compound include 2,5-dimercapto-1,3,4-thiaziazole represented by $C_2N_2S(SH)_2$ and s-triazine-2,4,6-trithiol represented by $C_3H_3N_3S_3$. A compound having a disulfide group in its molecule and having a conformation which enables a reversible cleavage of an S-S bond of the disulfide group in its molecule can also be preferably used. An example of this kind of compound includes 1,8-disulfide naphthalene. The above-mentioned compound having a disulfide group and compounds having a group capable of forming a disulfide group (a mercapto group, for example) are hereinafter referred to as disulfide compounds.

As the conductive polymer, $\pi$ electron conjugated conductive polymer is used. Examples of the conductive polymer include polymers obtained by polymerizing thiophene, pyrrole, aniline, furan, benzene, or the like. More specifically, examples of the polymers include polyaniline, polypyrrol, polythiophene, and polyacene. These $\pi$ electron conjugated conductive polymers are reduced and oxidized with a high reversibility in 0 to $\pm 1.0$ V versus an Ag/AgCl electrode. These polymers are capable of having a porous fibril structure, holding a disulfide compound in their pores, and effectively forming a reversible electrode, depending on the polymerization conditions. Conductive polymers which are doped with anions such as iodine exhibit excellent properties.

As for the first electrode material of the present invention, the combination of the above-mentioned disulfide compound and a conductive polymer is used. This combination can be conducted by a wellknown method such as mixing, impregnating, or coating. For example, a fibril layer of the conductive polymer is formed on a stainless steel base material by electrolytic polymerization, after which a salt in the disulfide compound is impregnated in the fibril layer, thereby obtaining a composite electrode. Alternatively, the disulfide compound particles are dispersed in a solvent in which the conductive polymer is dissolved, and after that, the solvent is removed, whereby a layer of the conductive polymer is formed on the surface of the disulfide compound particle. Furthermore, the conductive polymer particles obtained by the chemical polymerization or electrolytic polymerization can be mixed with the disulfide compound particles.

As another method, the electrode material of the present invention can be obtained by polymerizing a monomer capable of forming a $\pi$ electron conjugated conductive polymer in the presence of the compound having a disulfide group in its molecule and having a conformation which enables a reversible cleavage of an S-S bond of the disulfide group in its molecule (e.g., 1,8-disulfide naphthalene). For example, when aniline is subjected to the electrolytic polymerization on an electrode in the presence of 1,8-disulfide naphthalene, a composite film of polyaniline-1,8-disulfide naphthalene is formed.

Alternatively, as another method, a dimer of a compound having a thiol group can be used instead of a compound having a conformation which enables a reversible cleavage of an S-S bond in its molecule. For example, a dimer of 2-mercapto-2-thiazoline is obtained, and a polyaniline-2-mercapto-2-thiazoline dimer composite film can be formed by using this dimer instead of 1,8-disulfide naphthalene. In any of the above cases, it is preferred that the polymerization is conducted under the conditions that a film having a fibril structure can be formed. In these methods, the compound in which a thiol group is protected is used, so that the conductive polymer can be prepared without any inhibition. In the composite film, a complex is formed from the disulfide compound and the conductive polymer, so that the disulfide compound is not likely to leak out of the composite film into the electrolyte when this composite film is used for a cathode of a rechargeable battery.

In the second electrode material of the present invention, a conductive polymer having a disulfide group is used. The conductive polymer having a disulfide group can be obtained, for example, by (1) introducing a disulfide group into a $\pi$ electron conjugated conductive polymer; or (2) electrolytic polymerization of a monomer capable of forming a $\pi$ electron conjugated conductive polymer and having a disulfide group.

As the $\pi$ electron conjugated conductive polymer in this method (1), a conductive polymer or derivatives thereof used for the first electrode material can be used. For example, halogenated pyrrol is subjected to the electrolytic polymerization to form a thin film of polyhalopyrrol on an electrode. At this time, it is preferred that the polymerization is conducted in the same way as in the case of the first electrode material under the conditions that a thin film having a fibril structure is formed. Then, a halogen group is converted into a mercapto group by thiourea to form polypyrrol having a mercapto group. After that, a compound having a mercapto group is reacted with the polypyrrol having a mercapto group to form polypyrrol having a disulfide group. As the compound having a mercapto group, the disulfide compound (which is a reduced form and has an SH group) used for the first electrode material, for example, 2,5-dimercapto-1,3,4-thiadiazole is preferably used. The conductive polymer in a thin film shape having a disulfide group so obtained can be used as a reversible electrode.

As the monomer capable of forming a $\pi$ electron conjugated conductive polymer in this method (2), the monomer (e.g., thiophene and pyrrol) in which a disulfide group is introduced and capable of forming a conductive polymer used in the first electrode material can be used. A conductive polymer having a disulfide group can be obtained by polymerizing this monomer. For example, a thiophene derivative having a disulfide group can be obtained by reacting thiophene having a mercapto group with the dimercapto compound which is a reduced form and has an SH group. The thiophene derivative having a disulfide group thus obtained (e.g., 2,5-dimercapto-1,3,4-thiaziazole) is used for the first electrode. This thiophene derivative is subjected to the electrolytic polymerization on an electrode, whereby a conductive polymer film having a disulfide group can be formed. It is preferred that the polymerization is conducted under such conditions that a film having a fibril structure is formed. The conductive polymer film thus formed functions as a reversible electrode.

When the electrolytic reduction is conducted under the conditions that metal ions or protons coexist in the electrode made of the electrode material of the present invention, the S-S bond of the disulfide group of the electrode material is cleaved to form a sulfur-metal ion bond or a sulfur-proton bond. The resulting electrode is subjected to electrolytic oxidation, the sulfur-metal ion bond or sulfur-proton bond returns to the S-S bond.

Examples of the metal ion include an alkali metal ion and an alkaline earth metal ion. In the case where the electrode made of the electrode material of the present invention is used as a cathode, and a lithium ion is used as the alkali metal ion; when an electrode made of lithium or a lithium alloy such as lithium-aluminium is used as an anode which supplies and captures lithium ions, and an electrolyte which can transmit lithium ions is used, a battery having a voltage of 3 to 4 V can be obtained. When an electrode made of a hydrogen storage alloy such as $LaNi_5$ is used as an anode which supplies and captures protons, and an electrolyte which can conduct protons is used, a battery having a voltage of 1 to 2 V can be obtained.

In the combination of the disulfide compound and the $\pi$ electron conjugated conductive polymer which are the electrode materials of the present invention, the $\pi$ electron conjugated conductive polymer functions as an electrode catalyst for the electrolytic oxidation and reduction of the disulfide compound. In the case of the $\pi$ electron conjugated conductive polymer having a disulfide group, when the disulfide group is subjected to the electrolytic oxidation and reduction, the electronic structure given by the conjugated $\pi$ electron functions as an electrode catalyst. In the case of the disulfide compound alone, the difference between the oxidation potential and the reduction potential is 1 V or more. However, in the case of using a combination of the $\pi$ electron conjugated conductive polymer and the disulfide compound, or the conductive polymer having a disulfide group, the difference between the oxidation potential and the reduction potential is reduced to 0.1 V or less. In the disulfide compound which is combined with the $\pi$ electron conjugated conductive polymer or which is introduced into such a polymer, the electrode reaction is promoted and a higher current density at room temperature is obtained on electrolysis, i.e., on charging or discharging. when the electrode material of the present invention is subjected to electrolytic oxidation, the $\pi$ electron conjugated conductive polymer (a conjugated polymer portion in the case of the conductive polymer having a disulfide group) is oxidized at first and the resulting oxidized form of the polymer oxidizes the reduced type of the disulfide compound (an SH or S-metal ion portion in the case of the conductive polymer having a disulfide group). Thus, the oxidized form of the $\pi$ electron conjugated polymer returns to the reduced form and an oxidized form of the disulfide compound is generated (i.e., a disulfide group is formed). When the electrolytic reduction is first conducted, the conductive polymer is reduced and the resulting reduced form reduces the oxidized form of the disulfide compound. Thus, the reduced form of the $\pi$ electron conjugated polymer returns to the oxidized form and the disulfide compound becomes a reduced form. The introduction of the electrode catalyst into the disulfide compound electrode is disclosed in U.S. Pat. No. 4,833,048 or J. Electrochem. Soc., Vol. 136, pp. 2570-2575 (1989). However, as the electrode catalyst, only the organic metallic compound is disclosed. The effects of the electrode catalyst are not described in detail. As described above, the $\pi$ electron conjugated polymer or the conjugated polymer portion has a function for promoting the movement of the electrons in the oxidation-reduction reaction. It functions as a catalyst in the oxidation-reduction of disulfide, reducing the activation energy of the reaction. In addition to that, the $\pi$ electron conjugated polymer or the conjugated polymer portion increases an effective reaction area between the electrolyte and the electrodes.

In the lithium battery of the present invention, an electrode made of the electrode material of the present invention is used as a cathode, an electrode made of a composition comprising as its main components a mixture of aluminium or an alloy containing aluminium and carbon is used as an anode, and a solid electrolyte made of a salt containing lithium or a polymer containing the salt is used as an electrolyte.

As a material for the cathode, a combination of a lithium salt of a reduced form of the compound having a disulfide group and the conductive polymer; or the conductive polymer having a disulfide group in which an S-S bond is cleaved to form a thiol group and this thiol group exists as a lithium salt can be used. Examples of the lithium salt of a reduced form of the compound having a disulfide group include 2,5-dimercapto-1,3,4-thiaziazole dilithium salt represented by $C_2N_2S(SLi)_2$ and lithium diethyldithiocarbamate represented by $[(C_2H_5)_2NCSS]Li$. The above-mentioned conductive polymer has a group derived from these compounds. In these electrode materials, lithium ions are liberated by the electrolytic oxidation, an S-S bond is formed, and the S-S bond returns to the S-Li bond by the reduction. Examples of the carbon material comprised in the anode include natural graphite, artificial graphite, amorphous carbon, fibrous carbon, powdery carbon, petroleum pitch carbon, and coal coke carbon. It is preferred that these carbon materials are particles or fibers having a diameter of 0.01 to 10 $\mu$m and a length of from several $\mu$m to several mm.

An example of the aluminium or alloys thereof comprised in the anode includes Al, Al-Fe, Al-Si, Al-Zn, Al-Li, and Al-Zn-Si. It is preferred that the aluminum or alloys thereof are flaky powders obtained by rapid cooling, or spherical or amorphous powders obtained by mechanical crushing in the air or an inactive gas such as nitrogen. The particle size is preferably 1 $\mu$m to 100 $\mu$m. The mixing ratio of the carbon material to the aluminum or aluminum alloy is 0.01 to 5 parts by weight, preferably 0.05 to 0.5 parts by weight based on one part by weight of the aluminium or aluminium alloy. When the amount of the carbon material is 0.01 parts by weight or less, there is a possibility that it is difficult to uniformly mix the carbon material with the aluminium powders or aluminium alloy powders; and the carbon material powders become aggregate, and the electrical connection among the aluminium powders or the aluminium alloy powders becomes poor, resulting in an electrode with a higher electrical resistance. When the amount of the carbon material exceeds 5 parts by weight, there is a possibility that the aluminum powders or aluminium alloy powders are thickly covered with the carbon materials. Thus, the contact between the electrode and the electrolyte is broken, whereby the potential becomes unstable or the polarization becomes larger.

The electrolyte of the lithium secondary battery of the present invention is a lithiumconductive solid electrolyte (solid or semisolid at a temperature of $-20°$ to $60°$ C.). This solid electrolyte is made of a salt containing lithium or a polymer containing the salt. Examples of the salt containing lithium include LiI, $Li_3N$-LiI-$B_2O_3$, $LiI.H_2O$, and Li-$\beta$-$Al_2O_3$. As the polymer electrolyte containing these salts, there is polyethylene oxide in which a lithium salt is dissolved. In addition, solid electrolyte films formed from a polyacrylonitrile film comprising propylene carbonate in which $LiClO_4$ is dissolved can be used. As described below, when the electrolyte is mixed in at least one of the cathode and the anode, a solid electrolyte composition comprising a polyether obtained by adding ethylene oxide and butylene oxide to a polyamine, an ion-exchangeable compound having a layered crystal structure, and a lithium salt is preferably used.

The polyether can be obtained by the addition reaction of ethylene oxide and butylene oxide with polyamine under an alkali catalyst at 100° to 180° C. and an atmospheric pressure of 1 to 10 atm. As the polyamine which is a component of the above polyether, polyethylenimine, polyalkylenepolyamine or derivatives thereof can be used. Examples of the polyalkylenepolyamine include diethylenetriamine, triethylenetetramine, hexamethylenetetramine, and dipropylenetriamine. The additional number of the total moles of ethylene oxide and butylene oxide is 2 to 150 moles per one active hydrogen of the polyamine. The molar ratio of ethylene oxide (EO) to butylene oxide (BO) is 80/20 to 10/90 (=EO/BO). The average molecular weight of the polyether thus obtained is in the range of 1,000 to 5,000,000. It is preferred that the polyether is contained in the solid electrode composition in an amount of 0.5 to 20% by weight. Examples of the ionexchangeable compound having a layered crystal structure include clay minerals including silicate such as montmorillonite, hectorite, saponite, and smectite, phosphoric esters such as zirconium phosphate and titanium phosphate, vanadic acid, antimonic acid, tungstic acid; or substances obtained by modifying these acids with organic cations such as quarternary ammonium salts or with organic polar compounds such as ethylene oxide and butylene oxide. In this solid electrolyte composition, polyether which is a component thereof has a surfactant property and functions so that this composition is uniformly dispersed and mixed in at least one of the cathode and the anode, whereby the polarization can be decreased.

In general, the lithium secondary battery of the present invention can be prepared by the following method. For example, first, the cathode, anode, and electrolyte components are mixed to mold into films, respectively. The cathode film, electrolyte film, and anode film are layered in this order and pressed together, thereby obtaining a unit cell. If required, copper foils and leads are attached to the cathode and the anode of this laminated unit cell, and it is packaged, whereby a lithium secondary battery can be obtained. It is recommended that the electrolyte component is admixed in the cathode and/or the anode.

When the lithium secondary battery of the present invention is charged, Li is liberated from an S-Li bond of the cathode and an S-S bond is formed. On the surface of the anode or inside the anode (when the anode component and the electrolyte component are mixed), lithium is uniformly deposited. Since lithium is directly deposited from the electrolyte, impurities such as oxygen are not likely to contaminate. Accordingly, even when the charging and discharging are repeated, current is not likely to concentrate, whereby any short-circuit in the battery can be effectively prevented. Lithium generated during charging (electrolysis) and electrolyte are in a good contact with each other, so that the polarization during discharging can be decreased, and a higher current can be realized. As described above, when the electrolyte is mixed in the cathode and/or the anode, especially effective results can be obtained. At this time, it is particularly effective that compounds having lithium salts, polyether, and a layered crystal structure are used as the electrolyte.

As a lithium secondary battery (with a high voltage of 3 to 4 V and a high energy density of 100 Wh/kg or more), a battery in which lithium or a lithium alloy is used for an anode and an inorganic substance capable of taking in and out lithium ions, such as titanium disulfide, molybdenum disulfide, vanadium oxide, and cobalt oxide is used for a cathode has been proposed. As the electrolyte for this kind of battery, a liquid electrolyte obtained by dissolving a lithium salt such as lithium perchlorate or lithium boron fluoride in an aprotic organic solvent such as propylene carbonate and dimethoxyethane is exclusively used. Since the ionic conductance of this liquid electrolyte is smaller by two to three figures than that of an aqueous electrolyte which is used in the nickel-cadmium secondary or lead-acid batteries, it is required to have a larger electrode area and to make the separator thinner in order to obtain a larger current comparable to that of these batteries. Because of this, in general, the cathode can be prepared by molding a composition obtained by mixing a powdery cathode-active material (such as the above-mentioned titanium disulfide), a conductive substance, and a binder into a sheet shape. Besides molding into a sheet shape, a larger electrode area can be obtained by using particles with a smaller size or porous particles. However, in order to obtain an anode with a large area by using lithium or a lithium alloy which is too soft to be pulverized, molding into a thin foil shape is the only alternative. The cathode and anode molded into a sheet shape are layered one over the other with a separator such as polypropylene nonwoven fabric sandwiched therebetween and twisted in a swirl shape. The resulting cathode and anode are put in a battery case and the electrolyte is poured into this case, thereby obtaining the above-mentioned lithium battery. Because of the use of lithium, it is required that the whole process for the fabrication of the battery is performed in a dry inert gas.

The important point in fabricating the lithium secondary battery is to make the entire surfaces of the electrodes, which are in contact with the electrolyte, uniform and homogeneous. In general, the cathode is made of a composition comprising a cathode-active component, a conductive material, and a binder. If a chemically stable cathode-active material is selected and these components are uniformly mixed, a relatively homogeneous cathode can be obtained. In contrast, in the case of the anode, since lithium or a lithium alloy foil having a thickness of several $\mu$m to several 10 $\mu$m is subjected to a rolling process including many steps, it is difficult to obtain a uniform and homogeneous anode. Moreover, in the step for assembling a battery, the anode is likely to be locally stretched. Therefore, during charging and discharging of the battery, lithium is non-uniformly dissolved and deposited on the anode surface and non-uniformity is increased with the repetition of the charging and discharging cycles. Then, the current locally concentrates, and lithium starts to deposit in a dendritic shape. This deposition of lithium causes the breakage of the separator, resulting in an internal short-circuit. Because of this internal short-circuit, a great amount of current flows to generate heat in the battery, and the vapor pressure of the organic solvent is increased, causing the battery to burst. Lithium which is exposed to the air reacts with water to generate hydrogen, leading to ignition. It is very dangerous.

In contrast, the lithium secondary battery of the present invention can be prepared without using lithium or a lithium alloy, so that this battery is safe and complicated operation is not required. When the battery is stored in a discharging state, lithium does not substantially exist in the battery, so that the battery does not ignite even if it is broken. As described above, when the battery is charged, lithium is uniformly deposited, so that the repetition of the charging and discharging is not likely to cause any internal short-circuit. Thus, this battery is safe. When powdery, fibrous, or porous aluminium or its alloy is used as an material of the anode, the electrode area becomes larger. Therefore, it is not necessary to make the material of the anode in a thin sheet shape or a thin film.

EXAMPLE 1

One mol/dm$^3$ of aniline and 5M (M=mol/dm$^3$) of Na$_2$SO$_4$ were dissolved in a sulfuric acid aqueous solution to obtain a sulfuric acid aqueous solution (pH=1.0). This aqueous solution was electrolyzed at a constant potential of 1.2 to 1.5 V versus a saturated calomel reference electrode to form a polyaniline film having a thickness of about 20 $\mu$m with a fibril structure on a graphite electrode. The graphite electrode having the polyaniline film thus obtained was dried in vacuo at 80° C. for 24 hours. After that, the graphite electrode was electrolyzed at a constant potential of +0.8 V versus an Ag/AgCl reference electrode in dimethylformamide in which 5 mM of 2,5-dimercapto-1,3,4-thiaziazole and 1M of LiClO$_4$ were dissolved, thereby preparing a composite electrode.

This composite electrode was electrolyzed at room temperature by linearly increasing and decreasing the potential at a speed of 50 mV/sec in the range of −0.7 to +0.2 V versus the Ag/AgCl reference electrode. A current-voltage curve A in FIG. 1 was obtained. Next, as a comparative example, the electrolysis was performed by linearly increasing and decreasing the potential in the range of −0.7 to +0.2 V in the same way as described above except that a graphite electrode having no polyaniline film was used. As a result, a current-voltage curve B in FIG. 1 was obtained. Furthermore, the electrolysis was performed by linearly increasing and decreasing the potential in the range of −0.7 to +0.2 V in the same way as described above except that a graphite electrode having only a polyaniline film was used. As a result, a current-voltage curve C in FIG. 1 was obtained.

In the curve A, the current peak values corresponding to the oxidation-reduction reaction are higher than those of the graphite electrode having only a polyaniline film and those of 2,5-dimercapto-1,3,4-thiaziazole, respectively. Thus, by using the electrode made of the polyaniline film and the disulfide compound of the present invention, a greater amount of current can be obtained. Furthermore, in the curve A, the current peak positions corresponding to the oxidation-reduction reaction are between current peak positions of the graphite electrode having only a polyaniline film and current peak positions of 2,5-dimercapto-1,3,4-thiaziazole. In the curve A, a current peak position corresponding to the reduction reaction exists in the vicinity of −0.2 V. In the curve B obtained by using the graphite electrode having no polyaniline film, a current peak position was in the vicinity of −0.6 V. That is, it is understood that the oxidation-reduction reaction of 2,5-dimercapto-1,3,4-thiaziazole is promoted with the help of polyaniline which is a $\pi$ electron conjugated conductive polymer.

As described above, in the curve B obtained by using the graphite electrode having no polyaniline film, the potential difference between the oxidation peak and the reduction peak corresponding to the oxidation-reduction reaction of 2,5-dimercapto-1,3,4-thiaziazole is approximated by 0.6 V. In this way, on the graphite electrode having no polyaniline film, the oxidation-reduction reaction is quasi-reversible, and its reaction speed is slower. For example, when this electrode is used as a cathode for a battery, the difference in the voltage between the charge and discharge is 0.6 V or more, so that the battery provides less efficiency on charging and discharging at a higher current.

EXAMPLE 2

Aniline was chemically polymerized in an acid aqueous solution by using cupric boron fluoride as an oxidizing agent to obtain a porous polyaniline powder having an average particle size of 0.3 μm with a fibril structure. Then, 1 part by weight of the polyaniline powder, 1 part by weight of 2,5-dimercapto-1,3,4-thiaziazole powder and 0.1 part by weight of carbon black were mixed in toluene in which polyethylene with a low density (Trade name: EXCELLEN VL-200, density=0.9, manufactured by Sumitomo Chemical Industrial Co., Ltd.) was dissolved. This mixture was coated onto a stainless steel net of 200 mesh and dried, thereby producing a composite electrode in a sheet shape having a thickness of about 100 μm.

A battery A in a solid state with a size of 28×28 mm was constructed by using the composite electrode as a cathode, a polyacrylonitrile film having a thickness of about 70 μm containing propylene carbonate in which 1M of LiClO₄ was dissolved as a semisolid electrolyte film, and metallic lithium as an anode.

Figure 2:
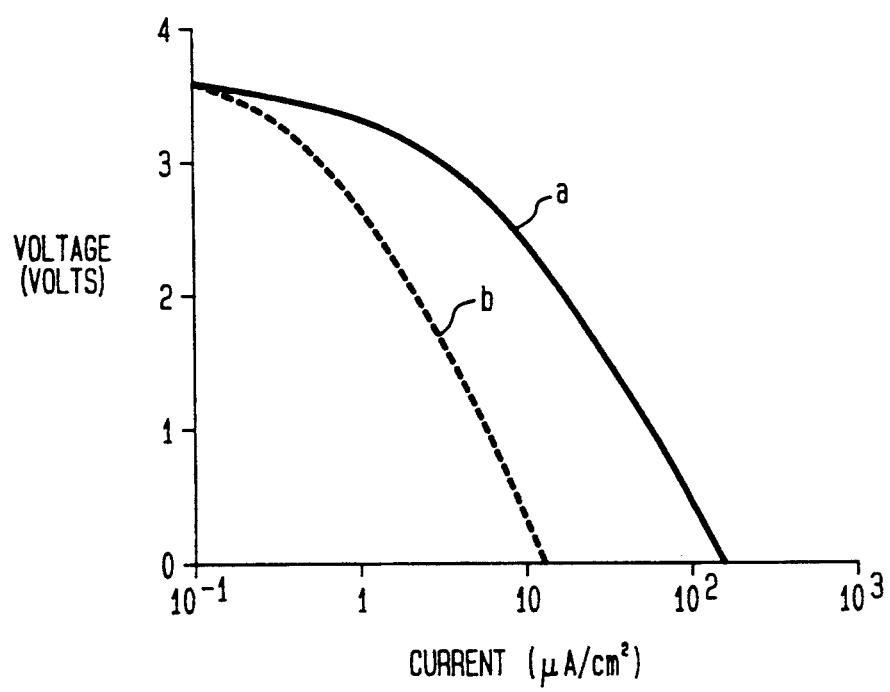
FIG. 2 is a graph showing current-voltage characteristics of a battery in Example 2 comprising a reversible cathode made of an electrode material of the present invention and a battery comprising a conventional cathode.

This battery was charged at room temperature at a constant voltage of 3.6 V for 17 hours, and after that, the battery was discharged at a current of 1 μA, 10 μA, 100 μA, 500 μA, and 1 mA, respectively for 3 seconds. Current-voltage characteristics were evaluated by recording a voltage at each current. This result is represented by a curve a in FIG. 2. As a comparative example, an electrode in a sheet shape having a thickness of about 100 μm containing no polyaniline powders was prepared as mentioned above. A battery B was constructed by using this electrode. The current-voltage characteristics of this battery is represented by curve b in FIG. 2. The battery A has smaller polarization than the battery B. The battery A provided a higher current output.

In these examples, by using the composite electrode made of a disulfide compound and a π electron conjugated conductive polymer, the electrolysis at a great amount of current can be made possible, which is difficult when the conventional electrode made of only disulfide compound is used. A secondary battery, which can be charged and discharged at a greater amount of current and has a higher energy density, can be provided by using this composite electrode as a cathode and lithium as an anode.

EXAMPLE 3

First, 11 g (0.1 mol) of pyrrol-2-carboxylic acid was dissolved in 200 ml of acetonitrile and cooled to a temperature of 0° C., after which 16 g (0.1 mol) of bromine was added dropwise to this solution. This solution was stirred for 60 minutes, and neutrolized with a 20% aqueous solution of sodium carbonate. Then, ether was added to the resulting solution, thereby extracting water with ether. The solution from which water was extracted was dried to remove the ether. Thus, a mixture of pyrrol-2-carboxylic acid in which one bromine was substituted or two bromines were substituted at the 3, 4, or 5 position was obtained. Then, 6 g of this mixture was dissolved in a mixed solution of 200 ml of xylene and 10 ml of ethanol amine and refluxed for 2 hours. The resulting mixture was mixed with a 30% acetic acid aqueous solution to extract unreacted components in the water phase; the organic phase was separated from the water phase; and xylene was removed from the the organic phase to obtain 3 g of mixture of mono-bromopyrrol and dibromopyrrol. This mixture was dissolved in xylene again and fractioned by using a silica gel column to obtain 1 g of 3-bromopyrrol.

The 3-bromopyrrol thus obtained was dissolved in a sulfuric acid aqueous solution to obtain a sulfuric acid aqueous solution (pH 1.0) containing 1 mol/l of 3-bromopyrrol. This aqueous solution was electrolyzed at a constant potential of 1.2 to 1.5 V versus the saturated calomel reference electrode, whereby a poly-3-bromopyrrol film having a thickness of about 20 μm with a fibril structure was formed on a graphite electrode. The graphite electrode having a poly-3-bromopyrrol film thus obtained was dried in vacuo at 80° C. for 24 hours. Then, 1 g (0.01 mol) of this polybromopyrrol in the resulting electrode was reacted with 0.8 g (0.01 mol) of thiourea, and a mercapto group was introduced therein. Furthermore, the resulting electrode was reacted with 1.2 g (0.01 mol) of 2,5-dimercapto-1,3,4-thiaziazole in the presence of chlorine to obtain an electrode having a polypyrrol into which disulfide groups were introduced. This polypyrrol was represented by the following formula.

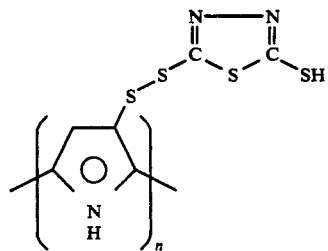

Figure 3:
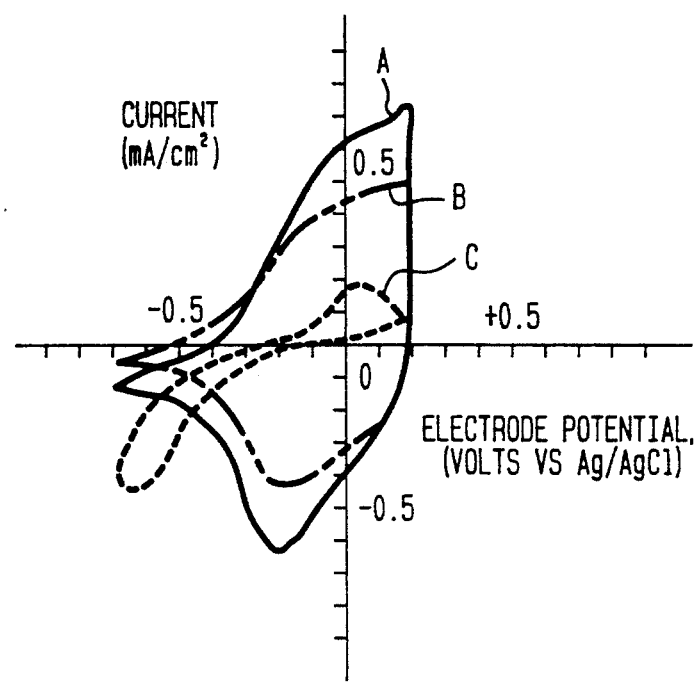
FIG. 3 is a graph showing current-voltage characteristics of a reversible electrode using an electrode material in Example 3 of the present invention and conventional electrodes.

This electrode was electrolyzed at room temperature by linearly increasing and decreasing a potential at a speed of 50 mV/sec in the range of −0.7 to +0.2 V versus an Ag/AgCl reference electrode in dimethylformamide in which 1 mol/l of LiClO₄ was dissolved. Thus, a current-voltage curve A shown in FIG. 3 was obtained.

As a comparative example, a graphite electrode was electrolyzed at a constant potential of +0.8 V versus the Ag/AgCl reference electrode in the dimethylformamide in which 0.05 mol/l of 2,5-dimercapto-1,3,4-thiaziazole and 0.5 mol/l of LiClO₄ were dissolved. A current-voltage curve B in FIG. 3 was obtained by polarizing the electrode having no polypyrrol film in the range of −0.7 to +0.2 V. Furthermore, a graphite electrode having only a polypyrrol film was produced and polarized in the range of −0.7 to +0.2 V in the same way as mentioned above. Thus, a current-voltage curve C shown in FIG. 3 was obtained.

In the curve A, the current peak values corresponding to the oxidation-reduction reaction are higher than those of the graphite electrode having only a polypyrrol film and those of 2,5-dimercapto-1,3,4-thiaziazole, respectively. Furthermore, in the curve A, the current peak positions corresponding to the oxidation-reduction reaction are between current peak positions of the graphite electrode having only a polypyrrol film and current peak positions of 2,5-dimercapto-1,3,4- thiaziazole. In the curve A, a current peak position corresponding to the reduction reaction exists in the vicinity of −0.2 V. In the curve C obtained by using the graphite electrode having only a polypyrrol film, a current peak position was obtained in the vicinity of −0.6 V. That is, it is understood that the oxidation-reduction reaction of 2,5-dimercapto-1,3,4-thiaziazole is promoted with polypyrrol which is a $\pi$ electron conjugated conductive polymer.

In the curve B obtained by using the graphite electrode having no polypyrrol film, the difference in the potential between the oxidation peak and the reduction peak corresponding to the oxidation-reduction reaction of 2,5-dimercapto-1,3,4-thiaziazole is approximated by 0.6 V. In this way, on the graphite electrode having no polypyrrol film, the oxidation-reduction reaction is quasi-reversible, and its reaction speed is slower. For example, when this electrode is used as a cathode of a battery, the difference in the voltage between the charging and the discharging is 0.6 V or more, so that the battery provides less efficiency on charging and discharging at a higher current.

In the present example, the case in which pyrrol is used as a monomer capable of forming a conductive polymer is described. However, the present invention is not limited thereto, and the same effects can be obtained even though other monomers such as aniline are used.

As is apparent from the above description, in the present example, the electrode can be obtained by introducing the disulfide compound into the conductive polymer. This electrode provides a higher current on electrolysis as compared with the conventional electrode constituted by the disulfide compound alone. A secondary battery in which charging and discharging can be performed at a great amount of current and which has a high energy density can be constructed by using this composite electrode as a cathode and lithium as an anode.

EXAMPLE 4

(1) Synthesis of 1,8-Disulfide Naphthalene

First, 60 g (0.27 mol) of 1-aminonaphthalene-8-sulfonic acid was kneaded with water in a mortar to obtain a paste. The paste was transferred to a flask, and 200 ml of water and 20 ml of sulfuric acid were added thereto. To this mixture, a solution obtained by dissolving 30 g (0.43 mol) of sodium nitrate in 100 ml of water was added while stirring over about 30 minutes. The resulting solution was kept at a temperature of −10° to −15° C. for about 1.5 hrs. for polymerization. Generated diazonium salt was obtained by filtrating, and was washed with 100 ml of chilled water. Then, to the resulting salt, 200 ml of sodium disulfide solution was added. The solution was allowed to stand for 3 hours at room temperature. After that, hydrochloric acid was added dropwise to this solution so as to keep pH at 7.5, and deposited sulfur was removed, whereby 45 g of sodium 8,8'-dithio-di-1-naphthalene sodium sulfate was obtained. This salt was put in chilled water; and 30 g (0.14 mol) of phosphorous pentachloride was added gradually to be reacted with the salt. This reaction solution was returned to room temperature and allowed to stand for 30 minutes. The resulting reaction solution was washed with benzene until it became colourless. The solution was filtrated, and the filtrate was concentrated to obtain a solid material. This solid material was recrystallized with methanol to obtain 16 g of n aphtho[1,8-c,d]-1,2-dithiol-1,1-dioxide. This compound was reduced for 1 hour in a hydrochloric acid solution in the presence of zinc powder, thereby obtaining 10 g of 1,8-disulfide naphthalene.

(2) Production of a Composite Electrode of 1,8-Disulfide Naphthalene and Polyaniline At first, 1,8-disulfide naphthalene obtained in item (1) was added to a solution comprising 0.5M of $Na_2SO_4$ (pH 1) and 0.1M of aniline so as to obtain a 10 mmol/l solution. This solution was electrolyzed using a graphite electrode at a constant potential of 1.2 V versus a saturated calomel reference electrode. Thus, a polyaniline-1,8-disulfide naphthalene composite film having a thickness of about 20 μm with a fibril structure was formed on the graphite electrode.

(3) Cyclic Voltammetry

Figure 4:
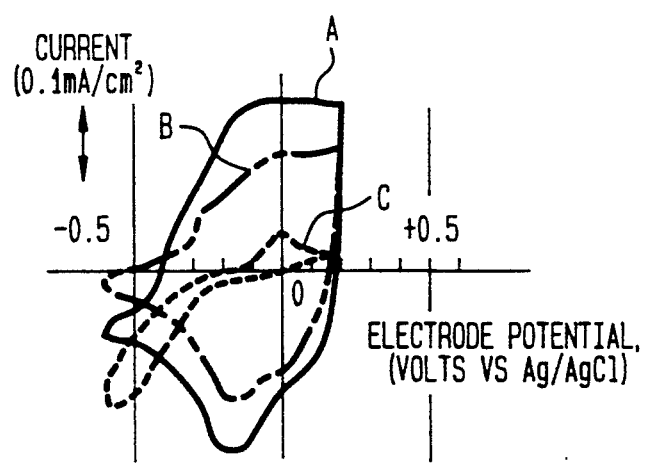
FIG. 4 is a graph showing current-voltage characteristics of a reversible electrode using an electrode material in Example 4 of the present invention and conventional electrodes.

The electrode obtained in item (2) was electrolyzed at room temperature by linearly increasing and decreasing the potential in the range of −0.7 to +0.2 V versus an Ag/AgCl reference electrode at a rate of 50 mV/sec in a dimethylformamide solution dissolving 1M of $LiClO_4$. As a result, a current-voltage curve A in FIG. 4 was obtained. As a comparative example, the graphite electrode was electrolyzed by linearly increasing and decreasing the potential in the range of −0.7 to +0.2 V versus the Ag/AgCl reference electrode at a speed of 50 mV/sec in dimethylformamide in which 10 mol/l of 1,8-disulfide naphthalene and 0.5 mol/l of $LiClO_4$ were dissolved. As a result, a current-voltage curve B in FIG. 4 was obtained. Furthermore, a graphite electrode having only a polyaniline film was electrolyzed in the same way to obtain a current-voltage curve C in FIG. 4.

In the curve A, current peak values corresponding to the oxidation-reduction reaction are higher than those of the graphite electrode having only a polyaniline film and those of 1,8-disulfide naphthalene, respectively. Thus, by using the electrode having a film made of the polyaniline and the disulfide compound of the present invention, a great amount of current can be obtained. Furthermore, in the curve A, current peak positions corresponding to the oxidation-reduction reaction are between current peak positions of the graphite electrode having only a polyaniline film and current peak positions of 1,8-disulfide naphthalene. In the curve A, a current peak position corresponding to the reduction reaction exists in the vicinity of −0.2 V. In the curve C obtained by using the electrode having only a polyaniline film, a current peak position is obtained in the vicinity of −0.6 V. That is, it is understood that the oxidation-reduction of 1,8-disulfide naphthalene is promoted due to the presence of thiophene derivative polymer which is an electron conductive polymer.

As described above, in the curve B obtained by using the graphite electrode having no polyaniline film, the difference in the potential between the oxidation peak and the reduction peak corresponding to the oxidation-reduction reaction of 1,8-disulfide naphthalene is approximately 0.6 V. In this kind of electrode, the oxidation-reduction is quasi-reversible, and its reaction speed is slower. For example, when this electrode is used as a cathode for a battery, the difference in the voltage between the charging and discharging is 0.6 V or more, so that the battery provides less efficiency on charging and discharging at a higher current.

In the present example, the case in which polyaniline is used is described. However, the same effects can be obtained even though other conductive polymers are used. In the present example, as a method for the polymerization, the electrolytic polymerization is used, however, a composite film can be formed by using an ordinary oxidation polymerization. Furthermore, when the film made of disulfide and conductive polymer is pulverized and mixed with an electrical conductive material which works as a current collector, the same effects can be obtained.

As is apparent from the above example, according to the present invention, since the reversible electrode can be constituted by using a compound having a disulfide bond in its molecule and a conductive polymer, a higher current can be obtained on electrolysis as compared with the conventional electrodes made of a disulfide compound alone. A rechargeable battery which can be charged and discharged at a great amount of current and has a higher energy density can be provided by using this electrode as a cathode and lithium as an anode.

EXAMPLE 5

At first, 84 g (1 mol) of thiophene and 100 ml of carbon tetrachloride were mixed and cooled to 0° C. To this mixture, a solution dissolving 500 g (3.1 mol) of bromine in 300 ml of carbon tetrachloride was gradually added. Then, the carbon tetrachloride was removed from the mixture by distillation, and 15 g of sodium hydroxide was added to the mixture, which was then heated on a steam bath for 4 hours. An alkali layer was removed from this mixture, and the residue was dried, thereby obtaining a mixture of monobromothiophene, dibromothiophene, and tribromothiophene. This mixture was dissolved in xylene, and fractionated with silica gel column to obtain 30 g of 2,3,5-tribromothiophene.

Then, 32 g (0.1 mol) of 2,3,5-tribromothiophene thus obtained, 6.5 g (0.2 mol) of zinc, and 6 g (0.2 mol) of acetic acid were reacted to obtain 3-bromothiophene.

Then, 4 g of thiourea was reacted with 8.0 g (0.05 mol) of 3-bromothiophene thus obtained in acetonitrile, whereby 2.0 g (0.01 mol) of 3-mercaptothiophene was obtained. This 3-mercaptothiophene was reacted with 1.2 g (0.01 mol) of 2,5-dimercapto-1,3,4-thiaziazole in chlorine to obtain thiophene into which a disulfide group was introduced.

The thiophene derivative thus obtained was dissolved in a concentration of 1 mol/l in propylene carbonate containing lithium perchlorate, and the thiophene derivative was electrolyzed using a graphite electrode at a constant potential of 1.2 to 1.5 V versus a saturated calomel reference electrode. Thus, a thiophene derivative polymerization film having a thickness of about 20 μm with a fibril structure was formed on the graphite electrode.

Figure 5:
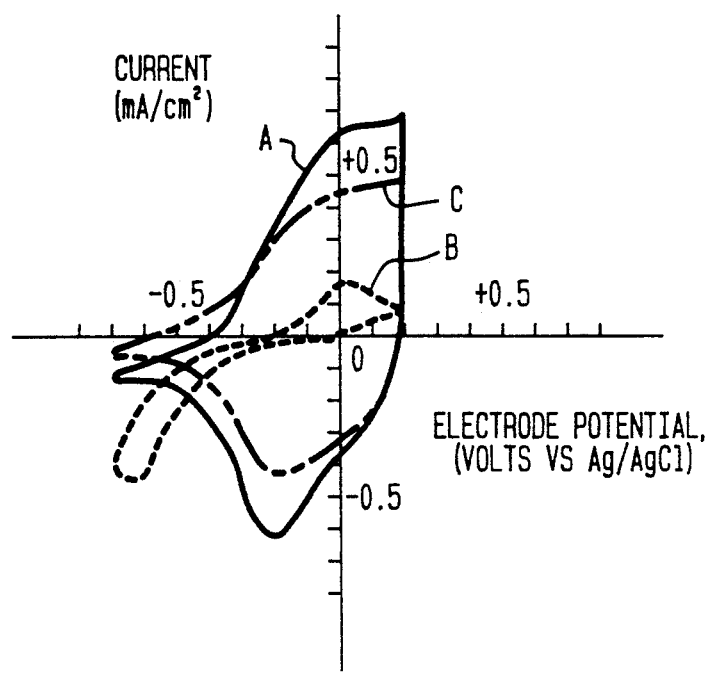
FIG. 5 is a graph showing current-voltage characteristics of a reversible electrode using an electrode material in Example 5 of the present invention and conventional electrodes.

The electrode thus obtained was electrolyzed at room temperature by linearly increasing and decreasing a potential in the range of −0.7 to +0.2 V versus the Ag/AgCl reference electrode at a speed of 50 mV/sec in dimethylformamide in which 1M of LiClO$_4$ was dissolved. As a result, a current-voltage curve A in FIG. 5 was obtained.

As a comparative example, a graphite electrode having no polythiophene film was electrolyzed in the same way as described above at a constant potential of +0.8 V versus the Ag/AgCl reference electrode in dimethylformamide in which 0.05 mol/l of 2,5-dimercapto-1,3,4-thiaziazole and 0.5 mol/l of LiClO$_4$ were dissolved. As a result, a current-voltage curve B in FIG. 5 was obtained. Furthermore, in the same way as described above, a graphite electrode having only a polythiophene film was electrolyzed. As a result, a current-voltage curve C in FIG. 5 was obtained.

In the curve A, the current peak values corresponding to the oxidation-reduction reaction are higher than those of the graphite electrode having only a polythiophene and those of 2,5-dimercapto-1,3,4-thiaziazole, respectively. Thus, by using the electrode made of the polythiophene film and the disulfide compound of the present invention, a higher current can be provided. Furthermore, in the curve A, the current peak positions corresponding to the oxidation-reduction reaction are between current peak positions of the graphite electrode having only a polythiophene and current peak positions of 2,5-dimercapto-1,3,4-thiaziazole. In the curve B, a current peak position corresponding to the reduction reaction exists in the vicinity of −0.6 V. In the curve A, the current peak position is obtained in the vicinity of −0.2 V. It is understood that the oxidation-reduction of 2,5-dimercapto-1,3,4-thiaziazole is promoted due to the presence of the polythiophene which is a conductive polymer.

In the curve B obtained by using the graphite electrode having no polyaniline film, the difference in the potential between the oxidation peak and the reduction peak corresponding to the oxidation-reduction reaction of 2,5-dimercapto-1,3,4-thiaziazole is approximately 0.6 V. In this way, on the graphite electrode having no polyaniline film, the oxidation-reduction reaction is quasi-reversible, and its reaction speed is slower. For example, when this electrode is used as a cathode for a battery, the difference in the voltage between the charging and discharging is 0.6 V or more, so that the battery provides less efficiency on charging and discharging at a higher current.

In the present example, the case in which polythiophene is used is described. However, the present invention is not limited thereto. The same effects can be obtained even when other conductive polymers are used. Furthermore, when the polymerization film of the present example is pulverized and mixed with a conductive material working as a current collector, the same effects can be obtained.

As is apparent from the above description, in the present example, a polymer is obtained by polymerizing a monomer obtained by introducing the disulfide compound into the monomer capable of forming a conductive polymer, and a reversible electrode is constituted by using this polymer as a main component. This electrode provides a higher current on electrolysis as compared with conventional electrodes consisting of disulfide compound alone. A rechargealbe battery in which charging and discharging can be performed at a great amount of current and which has a high energy density can be constituted by using this composite electrode as a cathode and lithium as an anode.

EXAMPLE 6

(1) Oxidation Polymerization of 2-Mercapto-2-Thiazoline (Preparation of a Dimer)

First, 60 g (0.5 mol) of 2-mercapto-2-thiazoline was dissolved in 100 ml of dimethylsulfoxide. Oxygen was blown into this solution, and then this solution was allowed to stand at room temperature for 24 hours, whereby this solution was subjected to oxidation polymerization. The obtained reaction solution was subjected to the preparation thin layer chromatography to obtain 48 g (0.2 mol) of 2-mercapto-2-thiazoline dimer.

(2) Production of a Composite Electrode of 2-Mercapto-2-Thiazoline Dimer

The 2-mercapto-2-thiazoline dimer obtained in item (1) of the present example was added to a solution containing 0.5M of $Na_2SO_4$ (pH=1) and 0.1M of aniline so that the 2-mercapto-2-thiazoline dimer was 10 mmol/l. The resulting solution was electrolyzed at a constant potential of 1.2 to 1.5 V versus a saturated calomel reference electrode to form a polyaniline-2-mercapto-2-thiazoline dimer composite film having a thickness of about 20 μm with a fibril structure on a graphite electrode.

As a comparative example, 2-mercapto-2-thiazoline was added to a solution containing 0.5M of $Na_2SO_4$ (pH=1) and 0.1M of aniline so that the 2-mercapto-2-thiazoline was 10 mmol/l. The resulting solution was electrolyzed at a constant potential of 1.2 to 1.5 V versus the saturated calomel reference electrode for the purpose of forming an electrolytic polymerization film. However, a composite film was not formed.

(3) Cyclic Voltammetry

Figure 6:
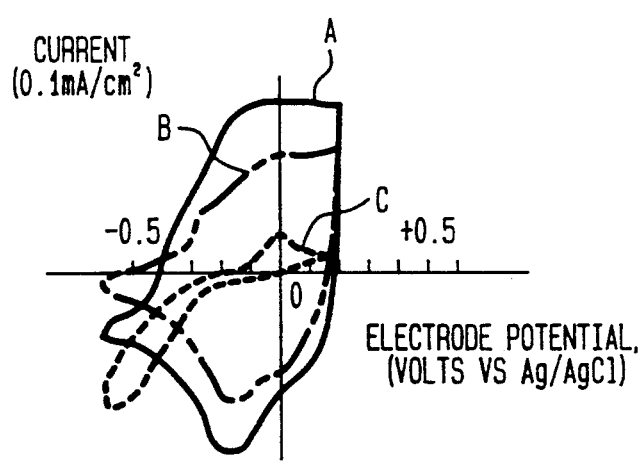
FIG. 6 is a graph showing current-voltage characteristics of a reversible electrode using an electrode material in Example 6 of the present invention and conventional electrodes.

The polyaniline-2-mercapto-2-thiazoline dimer composite electrode obtained in item (2) of the present example was electrolyzed at room temperature by linearly increasing and decreasing a potential in the range of −0.7 to +0.2 V versus an Ag/AgCl reference electrode at a rate of 50 mV/sec in dimethylformamide in which 1M of $LiClO_4$ was dissolved. As a result, a current-voltage curve A in FIG. 6 was obtained. As a comparative example, a graphite electrode was electrolyzed by linearly increasing and decreasing a potential in the range of −0.7 to +0.2 V versus the Ag/AgCl reference electrode at a speed of 50 mV/sec in dimethylformamide in which 10 mmol/l of 2-mercapto-2-thiazoline and 0.5 mol/l of $LiClO_4$ were dissolved. As a result, a current-voltage curve B as shown in FIG. 6 was obtained. Furthermore, a graphite electrode having only a polyaniline polymerization film was electrolyzed in the same way as described above. As a result, a current-voltage curve C as shown in FIG. 6 was obtained.

In the curve A, the current peak values corresponding to the oxidation-reduction are higher than those of the graphite electrode having only a polyaniline polymerization film and those of 2-mercapto-2-thiazoline dimer, respectively. Thus, by using the electrode made of the polyaniline polymerization film and the disulfide compound of the present invention, a higher current can be provided on electrolysis. Furthermore, in the curve A, current peak positions corresponding to the oxidation-reduction reaction are between current peak positions of the graphite electrode having only a polyaniline polymerization film and current peak positions of 2-mercapto-2-thiazoline dimer. In the curve A, a current peak position corresponding to the reduction reaction exists in the vicinity of −0.2 V. When the graphite electrode having only a polyaniline polymerization film containing no 2-mercapto-2-thiazoline is used, a current peak position is −0.6 V. It is understood that the oxidation-reduction reaction of 2-mercapto-2-thiazoline is promoted due to the presence of polyaniline.

As described above, in the curve B obtained by using the graphite electrode having no polymer film, the difference in the potential between the oxidation peak and the reduction peak corresponding to the oxidation-reduction reaction of 2-mercapto-2-thiazoline is approximated by 0.6 V. In this way, in the graphite electrode having no polymer film, the oxidation-reduction reaction is quasi-reversible, and its reaction speed is slower. For example, when this electrode is used as a cathode of a battery, the difference in the voltage between the charging and discharging is 0.6 V or more, so that the battery provides less efficiency on charging and discharging at a higher current.

(4) Charging and Discharging Cyclic Characteristics

Figure 7:
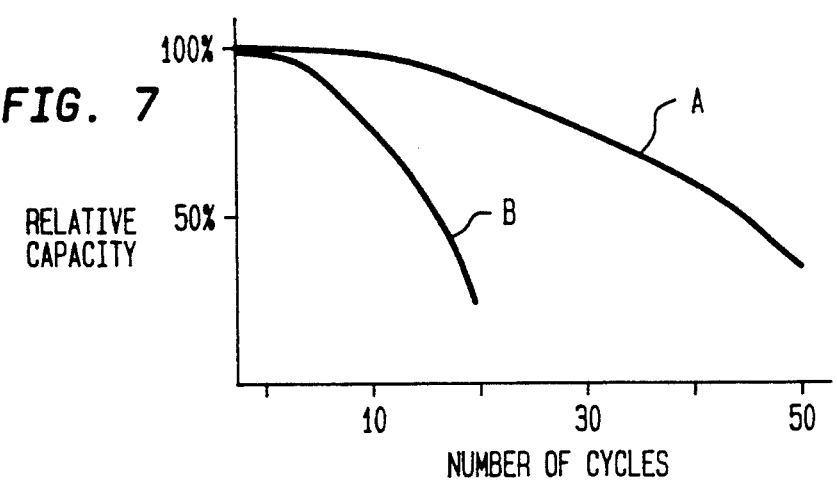
FIG. 7 is a graph showing charging and discharging cycle characteristics of a reversible electrode in Example 6 of the present invention and conventional electrodes.

A battery was produced with the following structure. The polyaniline-2-mercapto-2-thiazoline dimer composite electrode obtained in item (2) of the present example was used as a working electrode and an Li wire was used as a reference electrode. An Li foil was used as a counter electrode and a dimethylformamide solution in which 1M of $LiClO_4$ was dissolved was used as an electrolytic solution, thereby obtaining a battery. This battery was charged at a potential of 4.0 V for 15 hours, and after that, a charging and discharging cycle characteristic test was conducted under the conditions of an end voltage of 2.0 V and a discharging current of 0.5 mA. As a result, a charging and discharging cycle characteristic curve A as shown in FIG. 7 was obtained. In FIG. 7, the number of cycles are plotted on the horizontal axis and the relative discharge capacity after each charging and discharging cycle test when the discharge capacity after one cycle is made 100% is plotted on the vertical axis. As a comparative example, a composite electrode produced by mixing polyaniline, 2-mercapto-2-thiazoline, and polyethyleneoxide in a weight ratio of 3:1:1 was used as a working electrode and a battery was constructed in the same way. This battery was subjected to the same charging and discharging cycle test. As a result, a charging and discharging cycle characteristic curve B as shown in FIG. 7 was obtained. In the charging and discharging curve A of the present example, the battery still had over 50% of the initial capacity after 45 cycles while in the comparative example, the battery had over 50% of the initial capacity only after 15 cycles. This revealed that the battery of the present example was excellent in charging and discharging cycle characteristics.

In the present example, the case in which polyaniline is used as a conductive polymer is described. Even when other conductive polymers are used, the same effects can be obtained. As a method for the polymerization, the case in which the electrolytic polymerization is used is described. Even when ordinary oxidation polymerization is used, a composite film providing the same performance as the example can be formed. Furthermore, when the polymerization film of the present invention is pulverized and mixed with an electrical conductive material working as a current collector, the same effects can be obtained.

In the present example, as a disulfide compound having mercapto groups, 2-mercapto-2-thiazoline is used. Even when other compounds having mercapto groups are used, they can be reacted with conductive polymer to form the composite electrode which provide the same effects as described above. Furthermore, a battery can be constituted by using two or more kinds of compounds having thiol groups. For example, a copolymer is formed by the oxidation copolymerization of a compound having a plurality of thiol groups in its molecule and a compound having one thiol group, whereby a polymer (multimer) in which the thiol group is apparently protected is formed. It is possible that the multimer and a monomer capable of forming a conductive polymer coexist when this monomer is subjected to the electrolytic polymerization.

As is apparent from the above description, the electrode made mainly of the conductive polymer and the dimer (multimer) in which compounds having a thiol group are bonded to each other with disulfide between molecules can be obtained by the electrolytic polymerization and chemical oxidation polymerization. This reversible electrode provides a higher current as compared with the conventional electrodes consisted of disulfide compounds alone. A rechargeable battery which provides less efficiency on charging and discharging at a higher current and which has a high energy density can be provided by using this composite electrode as a cathode and a metallic lithium as an anode.

EXAMPLE 7

First, Ethylene oxide (EO) and butylene oxide (BO) were added to polyethylenimine having 10N atoms in its molecule so that the ratio of EO to BO was 30/70. Polyether having an average molecular weight of 180000 thus obtained was dissolved in acetonitrile to prepare 20% by weight of polyether solution. Furthermore, 10% by weight of $LiCF_3SO_3$ was dissolved in the polyether solution. To this polyether solution, $\gamma$-zirconium phosphate powders having an average particle size of 15 $\mu$m were added so that a solid content (i.e., total amount of polyether, $LiCF_3SO_3$, and $\gamma$-zirconium phosphate) became 30% by weight. This solution was mixed while stirring at 40° C. for 24 hours to obtain an electrolyte slurry. The electrolyte slurry was coated onto a flat plate made of Teflon by a doctor blade. The coating was dried in a stream of dried argon at 130° C. for 1 hour, and further dried in vacuo for 5 hours, thereby obtaining an electrolyte sheet with a size of 80×80 mm and a thickness of 85 $\mu$m.

Then, 0.1 parts by weight of artificial graphite powders having a degree of graphitization of 48% and an average particle size of 2 $\mu$m, 2 parts by weight of 2,5-dimercapto-1,3,4-thiazole lithium salt, and 0.5 parts by weight of polyaniline powders were admixed with 1 part by weight of the electrolyte slurry, thereby obtaining a cathode slurry. The polyaniline powders were obtained by electrolyzing a sulfuric acid aqueous solution (pH=0.1) containing 1M (M=mol/dm$^3$) of aniline and 5M of $Na_2SO_4$ at a constant potential of 1.2 to 1.5 V versus a saturated calomel reference electrode. This cathode slurry was coated onto a flat plate made of Teflon by a doctor blade. The coating was dried in a dry argon gas stream at 130° C. for 1 hour, and further dried in vacuo for 5 hours, thereby obtaining a cathode sheet with a size of 80×80 mm and a thickness of 160 $\mu$m.

Furthermore, 1 part by weight of metallic aluminium powders having an average particle size of 18 $\mu$m and a purity of 99.98%, and 0.1 parts by weight of artificial graphite powders having a degree of graphitization of 48% and an average particle size of 2 $\mu$m were added to the polyether solution in a manner that the solid content became 50%. The mixture was stirred at 40° C. for 24 hours to obtain an anode slurry. The anode slurry and the electrolyte slurry having the same composition as that of the above-mentioned electrolyte slurry were mixed in an alumina ball mill for 24 hours. The mixing ratio of the anode slurry to the electrolyte slurry was made 1 to 2 by weight as measured by the solid content of each slurry. This electrode composition slurry was coated onto a flat plate made of Teflon by doctor blade. The coating was dried in dried argon stream at 130° C. for 1 hour, and further dried in vacuo for 5 hours, thereby obtaining an anode sheet with a size of 80×80 mm and a thickness of 180 $\mu$m.

A carbon sheet comprising as its main components a fluororesin and carbon powders having a thickness of 50 $\mu$m, the cathode sheet, the electrolyte sheet, the anode sheet, and a carbon sheet having the same composition as that of the above-mentioned carbon sheet were layered in this order and pressed by heating under the conditions of a temperature of 150° C. and a pressure of 200 kg/cm$^2$. This laminated body was cut into a size of 28×28 mm to obtain a unit cell. Copper foils having a thickness of 30 $\mu$m which also function as electrode leads were thermally bonded to both surfaces of the unit cell via heat-adhesive conductive films having a thickness of 10 $\mu$m which comprise as main components thereof synthetic rubbers and carbon fibers. Furthermore, the entire unit cell was covered with a laminate film made of a polyethylene terephthalate having a thickness of 38 $\mu$m, an aluminium foil having a thickness of 50 $\mu$m, and a polyethylene film having a thickness of 50 $\mu$m to obtain a battery A.

As a comparative example, a battery B was produced by the following method. In an acetonitrile in which 2,5-dimercapto-1,3,4-thiazole lithium salt and 1 mol of $LiBF_4$ were dissolved was subjected to the electrolytic oxidation at a potential of 1.0 V versus an Ag-/AgCl electrode, thereby obtaining a disulfide compound containing no lithium ions. A battery B was obtained by the same method as that used for the battery A except that the disulfide compound was used instead of 2,5-dimercapto-1,3,4-thiazole lithium salt and a lithium alloy plate containing 30 atom % aluminium with a thickness of 200 $\mu$m was used as an anode.

Another lithium secondary battery of the present invention was prepared by the following method. First, 1 part by weight of 2,5-dimercapto-1,3,4-thiazole lithium salt powders, 0.2 parts by weight of polyaniline powders, 0.1 parts by weight of carbon black, 1 part by weight of $LiI-Li_3N-B_2O_3$ (molar ratio=1:1:1) powders, and a toluene solution containing 6% by weight of low density polyethylene were mixed. The above-mentioned polyaniline powders were synthesized by the chemical polymerization of aniline by the use of cupric boron fluoride as an oxidizing agent in an acid aqueous solution. The polyaniline powders are porous powders having an average particle size of 0.3 $\mu$m with a fibril structure. The low density polyethylene (Trade mark: EXCELLEN VL-200, density=0.9, manufactured by Sumitomo Chemical Industrial Co., Ltd.) was added so that the content of low density polyethylene became 5% by volume, when the above mixture was dried. Then, this mixture was coated onto a nylon net of 200 mesh and dried to obtain a cathode sheet with a size of 80×80 mm and a thickness of about 155 $\mu$m.

Next, $LiI-Li_3N-B_2O_3$ powders and a toluene solution of 6% by weight of low density polyethylene were mixed so that the content of the low density polyethylene became 35% by volume, when the mixture was dried. This mixture was coated onto a nylon net of 200 mesh and dried to obtain an electrolyte sheet with a size of 80×80 mm and a thickness of about 90 $\mu$m.

Furthermore, 1 part by weight of metallic aluminium powders, 0.1 parts by weight of graphite powders, 0.5 parts by weight of LiI-Li$_3$N-B$_2$O$_3$ powders, and a toluene solution of the low density polyethylene similar to the above were mixed so that the content of the low density polyethylene became 7.5% by volume. when the mixture was dried.

As the metallic aluminium, metallic aluminum powders having an average particle size of 18 μm and a purity of 99.98% were used. As the graphite powders, artificial graphite powders having a degree of graphitization of 90% and an average particle size of 0.6 μm were used. The mixture thus obtained was coated onto a nylon net of 200 mesh and dried to obtain an anode sheet with a size of 80×80 mm and a thickness of about 190 μm. A battery C was formed by layering the cathode sheet, the electrolyte sheet, and the anode sheet in the same was as that of the battery A.

As a comparative example, a battery D was produced by the following method. In an acetonitrile in which 1 mol of LiBF$_4$ was dissolved, 2,5-dimercapto-1,3,4-thiaziazole lithium salt was subjected to electrolytic oxidation at a potential of 1.0 V versus an Ag/AgCl electrode, thereby obtaining a disulfide compound having no lithium ions. A battery D was produced by the same method as that used for the battery C except that this disulfide compound was used instead of 2,5-dimercapto-1,3,4-thiaziazole lithium salt and a lithium alloy plate containing 30 atom % aluminium with a thickness of 200 μm was used as an anode.

Figure 8:
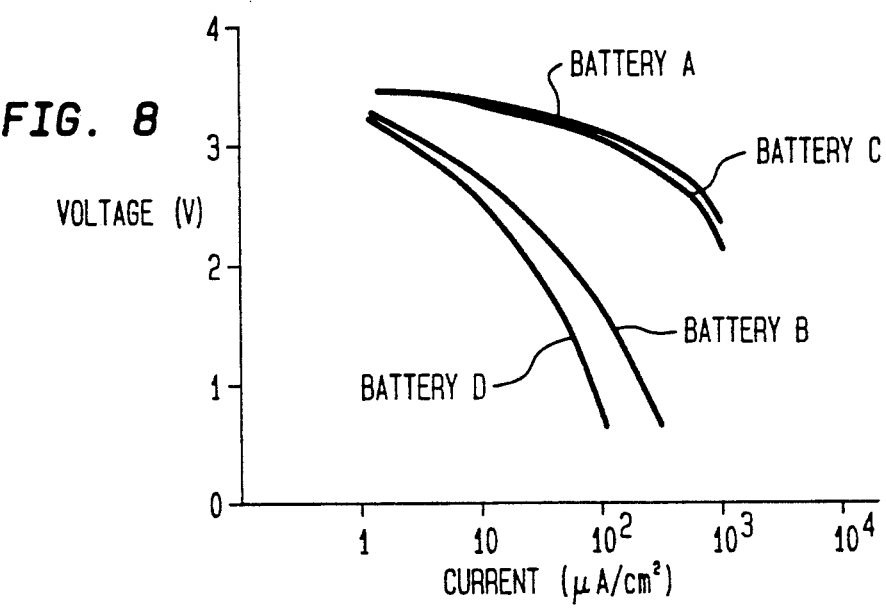
FIG. 8 is a graph showing current-voltage characteristics of a lithium battery in Example 7 of the present invention and conventional lithium batteries.

The batteries A, B, C, and D were charged at a constant voltage of 3.6 V at 65° C. for 17 hours, followed by discharging at each current of 1 μA, 10 μA, 100 μA, 500 μA, and 1 mA for 3 seconds at 65° C. At this time, current-voltage characteristics were evaluated by recording each voltage of the batteries. The results are shown in FIG. 8. It is noted that the batteries A and C provide a higher voltage as compared with the batteries B and D.

As is apparent from the above description, the lithium secondary battery of the present invention comprises a specific type of cathode and anode. The cathode is made of a composition comprising as its main components the π electron conjugated conductive polymer and the lithium thiolate compound which has a sulfurlithium ion bond and forms sulfur-sulfur bond on electrolytic oxidation; and the anode is made of a composition comprising as its main components aluminium or alloy thereof and carbon materials. Therefore, it is not necessary to deal with chemically active metallic lithium or any alloy thereof when a lithium secondary battery is produced, and moreover, the battery can be assembled with safety. When the lithium secondary battery thus assembled is stored in a discharged state, metallic lithium is not substantially present inside the battery. Therefore, when the battery is broken, there is no possibility that the battery will ignite. Moreover, by using the lithium battery of the present invention, a greater current can be obtained as compared with the conventional batteries which use metallic lithium or lithium alloy anode.

EXAMPLE 8

First, 84 g (1 mol) of thiophene and 100 ml of carbon tetrachloride were mixed and cooled to a temperature of 0° C. To this mixture, 300 ml of carbon tetrachloride solution in which 500 g (3.1 mol) of bromine was dissolved was gradually added. After mixing them, the carbon tetrachloride was removed from the mixture by distillation, and 15 g of sodium hydroxide was added. The mixture was heated on a steam bath for 4 hours. An alkali layer was removed from this mixture and the residue was dried and distilled. Thus, a mixture of monobromothiophene, dibromothiophene, and tribromothiophene was obtained. The mixture was dissolved in xylene and fractionated with a silica gel column to obtain 30 g of 2,3,5-tribromothiophene.

Then, 32 g (0.1 mol) of 2,3,5-tribromothiophene thus obtained were reacted with 6.5 g (0.2 mol) of zinc and 6 g (0.2 mol) of acetic acid to obtain 3-bromothiophene.

Then, 4 g of thiourea was added to 8.0 g (0.05 mol) of this 3-bromothiophene and the mixture was allowed to react in acetonitrile to obtain 2 g (0.01 mol) of 3-mercaptothiophene. This 3-mercaptothiophene and 0.8 g (0.01 mol) of 1-propylmercaptane were reacted in chlorine to obtain thiophene into which disulfide was introduced. The thiophene derivative (1 mol/l) thus obtained was electrolyzed in propylene carbonate at a constant potential of 1.2 to 1.5 V versus a saturated calomel reference electrode, using lithium perchlorate as a supporting electrolyte. A conductive polymer having a lithium thiolate group was obtained.

An electrolyte sheet having the same composition and size as that of the battery A in Example 7 was prepared.

A cathode sheet was prepared as follows: 1 part by weight of electrolyte slurry having the same composition as that used for the battery A in Example 7, 0.1 parts by weight of artificial graphite powders having a degree of graphitization of 48% and an average particle size of 2 μm, and 2 parts by weight of conductive polymer having the above-mentioned lithium thiolate group were mixed to obtain a cathode slurry; the cathode slurry was coated onto the flat plate made of Teflon by doctor blade; and the coating was dried in a stream of dried argon at 130° C. for 1 hour and further dried in vacuo for 5 hours to obtain a cathode sheet with a size of 80×80 mm and a thickness of 160 μm. A conductive polymer thin film 1 thus formed was pulverized and put in THF in which lithium was dispersed. Then, the obtained mixture was stirred at room temperature for 1 hour and reacted by futher stirring at 60° C. for 5 hours. Thus, a conductive polymer (hereinafter, referred to as conductive polymer 2) having lithium thiolate ($-S^--Li^+$) at side chains thereof was obtained.

An anode sheet having the same composition and size as those of the battery A in Example 7 was prepared.

A battery A of the present example was produced by laminating the cathode sheet, the electroyte sheet, and the anode sheet in the same way as in the battery A in Example 7.

A cathode composition which was similar to that of Example 1 was prepared by using the conductive polymer 1 in place of the conductive polymer containing lithium thiolate (the conductive polymer 2). An electrolyte composition was prepared in the same way as in Example 1. A battery B was prepared in the same way as in Example 1 by using as an anode a lithium alloy plate having a thickness of 200 μm and comprising 30 atom % of aluminium and using the above-mentioned cathode composition and electrolyte composition.

Another lithium rechargeable battery of the present invention was prepared by the following method. The thiophene derivative having a disulfide group synthesized in the above was chemically polymerized by using cupric boron fluoride as an oxidizing agent in an acid solution. As a result, a porous polymer 3 of thiphene derivative having an average particle size of 0.3 μm with a fibril structure was synthesized. The polymer 3 was put in a THF solution in which metallic lithium was dispersed. The resulting mixture was stirred at room temperature for 1 hour and further stirred at 60° C. for 5 hours to obtain a polymer 4 which had the side chains of lithium thiolate groups as represented by $-S^-Li^+$. Then, 0.2 parts by weight of polymer 4, 0.1 parts by weight of carbon black, 1 part by weight of LiI-Li$_3$N-B$_2$O$_3$ (molar ratio=1:1:1) powders, and a toluene solution containing 6% by weight of low density polyethylene were mixed. The low density polyethylene (Trade name: EXCELLEN VL-200, density=0.9, manufactured by Sumitomo Chemical Industrial Co., Ltd.) was added so that the content of low density polyethylene became 5% by volume, when the mixture was dried. The mixture thus obtained was coated onto a nylon net of 200 mesh and dried to obtain a cathode sheet with a size of 80×80 mm and a thickness of about 155 μm.

An electroyte sheet and an anode sheet which were similar to those used for preparing the battery C in Example 7 were prepared, respectively. A battery C of the present example was produced in the same way as the above by laminating the cathode sheet, the electrolyte sheet, and the anode sheet.

In place of the polymer 4, the polymer 3 which had thiol groups and contained no lithium ions was used to prepare a cathode sheet in the same manner as mentioned above. A battery D was constructed in the same manner as in the battery C except that this cathode sheet and a lithium alloy foil anode containing 30 atom % aluminium with a thickness of 200 μm were used.

Figure 9:
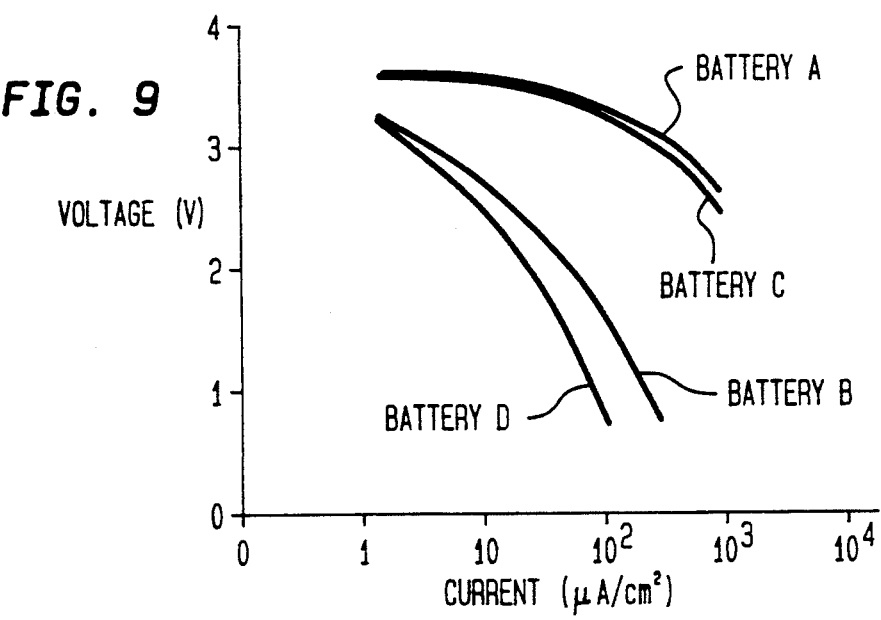
FIG. 9 is a graph showing current-voltage characteristics of a lithium battery in Example 8 of the present invention and a conventional lithium battery.

The batteries A, B, C, and D were charged at a constant voltage of 3.6 V at 65° C. for 17 hours, followed by discharging at each current of 1 μA, 10 μA, 100 μA, 500 μA, and 1 mA for 3 seconds at 65° C. At this time, current-voltage characteristics were evaluated by recording each voltage of the batteries. The results are shown in FIG. 9. It is noted that the batteries A and C provide a higher voltage as compared with the batteries B and D.

As described above, according to the present invention, it is not necessary to deal with chemically active metallic lithium or alloy thereof when a lithium rechargeable battery is produced, and moreover, the battery can be assembled with safety. When the lithium rechargeable battery thus assembled is stored in a discharged state, metallic lithium is not substantially present inside the battery. Therefore, if the battery is broken, there is no possibility that the battery will ignite. Moreover, by using the lithium battery of the present invention, a greater current can be obtained as compared with the conventional batteries which use a metallic lithium or alloy anode.

In Examples 1 to 8, rechargeable batteries using the composite electrodes are described. The composite electrodes of the present invention can also be used to fabricate electrochromic elements which have a fast coloring and discoloring speed, biochemical sensors such as a glucose sensor having a fast response speed, and electrochemical analog memories and the like which have a fast writing and reading speed.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A lithium secondary battery comprising a cathode, a solid electrolyte, and an anode,
   wherein the cathode is made of (a) a composition containing as its main components lithium thiolate having a sulfur-lithium ion bond capable of forming a disulfide bond by electrolytic oxidation and a π electron conjugated conductive polymer, or (b) a composition containing as its main component a π electron conjugated conductive polymer having a sulfur-lithium ion bond capable of forming a disulfide bond by electrolytic oxidation;
   wherein the solid electrolyte is made of a composition containing as its main component a salt containing lithium, or polymer containing a salt containing lithium; and
   wherein the anode is made of a composition containing as its main components aluminium or an alloy containing aluminium, and carbon.

2. A lithium secondary battery according to claim 1, wherein the electrolyte is mixed with a composition forming the cathode or a composition forming the anode.

3. A lithium secondary battery according to claim 1, wherein the solid electrolyte comprises a polyether obtained by adding at least one selected from the group consisting of ethylene oxide and propylene oxide to a polyamide; an ion-exchangeable compound having a layered crystal structure; and a lithium salt represented by LiX (wherein X is a strong acid anion).

4. An electrode material for reversibly performing electrolytic reduction and electrolytic oxidation, comprising
   (a) a combination of an organic compound having a disulfide group and a conductive polymer, or
   (b) a conductive polymer having a main chain, said conductive polymer comprising a disulfide group which is not a part of said main chain,
   wherein an S-S bond of the disulfide group is cleaved by the electrolytic reduction and re-formed by the electrolytic oxidation.

5. An electrode material according to claim 4, which comprises a combination of an organic compound having a disulfide group and a conductive polymer, wherein the organic compound having a disulfide group has a cleavable disulfide bond in its molecule.

6. An electrode material according claim 4, wherein the conductive polymer having a disulfide group is obtained by introducing a disulfide group into a π electron conjugated conductive polymer.

7. An electrode material according to claim 4, wherein the conductive polymer having a disulfide group is obtained by electrolytic polymerization of a monomer which has a disulfide group and is capable of forming a π electron conjugated conductive polymer.

* * * * *

UNITED STATES PATENT AND TRADEMARK OFFICE
CERTIFICATE OF CORRECTION

PATENT NO.    : 5,324,599
DATED         : June 28, 1994
INVENTOR(S)   : Oyama et al.

It is certified that error appears in the above-identified patent and that said Letters Patent is hereby corrected as shown below:

In column 24, line 37, the word "polyamide" should be --polyamine--.

Signed and Sealed this

Eighteenth Day of October, 1994

BRUCE LEHMAN

*Attest:*

*Attesting Officer*  *Commissioner of Patents and Trademarks*